(12) United States Patent
Bloxham

(10) Patent No.: US 6,189,903 B1
(45) Date of Patent: Feb. 20, 2001

(54) VEHICLE SUSPENSION GAS SUPPLY SYSTEM

(75) Inventor: David John Bloxham, Conventry (GB)

(73) Assignee: BTR Industries, Ltd., London (GB)

( * ) Notice: Under 35 U.S.C. 154(b), the term of this patent shall be extended for 0 days.

(21) Appl. No.: 09/195,546

(22) Filed: Nov. 19, 1998

(30) Foreign Application Priority Data

Nov. 19, 1997 (GB) .................................................. 9724444

(51) Int. Cl.⁷ .................................................. B60G 17/056
(52) U.S. Cl. .................................. 280/124.16; 280/6.157
(58) Field of Search ........................ 280/124.157, 124.16, 280/6.157, 6.158, 6.159

(56) References Cited

U.S. PATENT DOCUMENTS

| | | | |
|---|---|---|---|
| 4,238,128 | * 12/1980 | McKee | 280/6.152 |
| 4,264,014 | * 4/1981 | Hogg et al. | 212/276 |
| 4,611,815 | * 9/1986 | Sasage et al. | 280/6.159 |
| 5,273,308 | * 12/1993 | Griffiths | 280/6.151 |
| 5,344,189 | * 9/1994 | Tanaka et al. | 280/6.152 |
| 5,452,919 | * 9/1995 | Hoyle et al. | 280/5.514 |
| 5,466,007 | * 11/1995 | Smith | 280/6.157 |
| 5,467,595 | * 11/1995 | Smith | 60/410 |

FOREIGN PATENT DOCUMENTS

| | | |
|---|---|---|
| 941059 | 9/1962 | (GB) . |
| 2161895 | 1/1986 | (GB) . |
| 2273474 | 6/1994 | (GB) . |

\* cited by examiner

Primary Examiner—Brian L. Johnson
Assistant Examiner—David R. Dunn
(74) Attorney, Agent, or Firm—Young & Thompson

(57) ABSTRACT

A vehicle suspension gas supply system comprises valve means having a central chamber to which pressurised gas may be admitted and from which pressurised gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber, a compressor for supply of pressurised gas, a gas dryer interposed between said compressor and central chamber, a remotely operable supply valve operable to allow pressurised gas to be admitted to said central chamber, and a remotely operable exhaust control valve operable to control a pair of slave valves thereby to cause pressurised gas to be exhausted from the central chamber via said dryer.

10 Claims, 1 Drawing Sheet

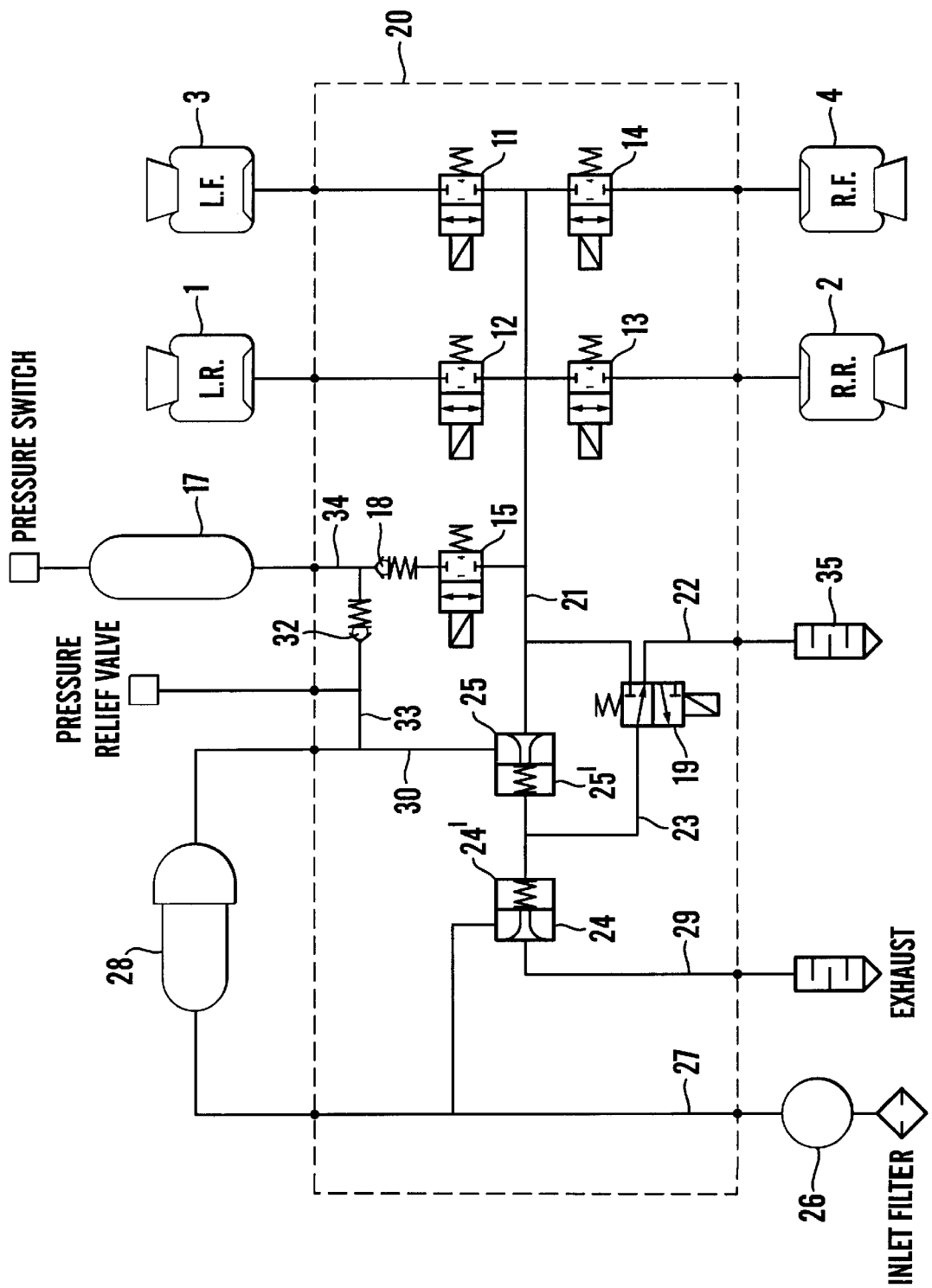

VEHICLE SUSPENSION GAS SUPPLY SYSTEM

This invention relates to a system for the supply of pressurised gas to gas springs forming part of a vehicle suspension and in particular, though not exclusively, to a gas supply assembly comprising a valve control unit and a source of pressurised gas.

The suspension system of an untracked wheeled vehicle typically comprises four gas suspension units disposed one proximate each respective corner of the vehicle and each suspension unit may have a gas chamber for containing a variable volume of gas whereby the suspension height of the vehicle may be controlled independently of load.

In a conventional arrangement two valves are associated with each suspension unit, one to permit exhaustion of gas from a suspension unit and the other to allow pressurised gas to be admitted to that suspension unit.

Whilst the aforedescribed configuration may be arranged to operate effectively, a considerable number of valves are needed and this adds undesirably to the weight and complexity of the suspension control equipment.

To reduce the required number of valve units it has been proposed to provide the system with valve means which comprises a central chamber to which pressurised gas may be admitted and from which pressurised gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber.

Two additional valve units may be provided, one for selectively communicating the central chamber to atmosphere for exhausting pressure from one or more gas suspension units, and the other for putting the central chamber in communication with a supply of pressurised gas whereby one or more gas suspension units may be selectively pressurised.

Preferably the supply of pressurised gas incorporates a dryer to remove excess moisture, thereby to prevent undue condensation forming within the valve means and gas suspension units, that dryer being arranged for operation regeneratively whereby gas exhausting from the central chamber is caused to pass through the dryer to facilitate removal of moisture accumulated therein.

The system preferably also comprises a reservoir to store compressed air from a compressor which need then operate only intermittently. To prevent undue accumulation of moisture in the reservoir and reduce load on the compressor it is desirable for the dryer to be interposed in the path from the compressor to the central chamber and reservoir. For a system of this type, with a reservoir and a regenerative type dryer, it has been necessary, for a four wheeled vehicle, to employ at least seven remotely actuable control valves, e.g. electrical solenoid valves, each selectively operable by valve control means in accordance with the instantaneous demand requirements of the vehicle suspension.

The present invention relates to a further improvement in a vehicle gas supply suspension system.

In accordance with one of its aspects the present invention provides a vehicle suspension gas supply system comprising valve means having a central chamber to which pressurised gas may be admitted and from which pressurised gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber, a compressor for supply of pressurised gas, a gas dryer interposed between said compressor and central chamber, a remotely operable supply valve operable to allow pressurised gas to be admitted to said central chamber, and a remotely operable exhaust control valve operable to control a pair of slave valves thereby to cause pressurised gas to be exhausted from the central chamber via said dryer.

Preferably the gas dryer also is interposed between the compressor and a reservoir. Said reservoir may be external of a manifold unit which contains the central chamber and valve units.

One or both of the remotely operable supply and exhaust valves may be electrically operated solenoid type valves, e.g. direct acting solenoids.

The slave valves may be diaphragm type valves. One slave valve may be operable by the exhaust control valve to allow gas to pass from the central chamber to the dryer. The other slave valve may be operable to allow gas to exhaust from that side of the dryer to which pressurised gas is supplied from the compressor, thereby creating regenerative action in the dryer during an exhaust operation. The two slave valves are simultaneously, operable by the exhaust control valve.

The exhaust control valve may be of a type which causes the slave valves to open, to allow pressurised gas to exhaust from the central chamber, by connecting the control sides of the slave valves to exhaust. During admission of pressurised gas to the central chamber the exhaust control valve is operated to direct pressurised gas to the control sides of the slave valves to set those valves to a closed position and thereby prevent the pressurised gas flowing to exhaust. Control means may be provided to set the exhaust control valve to a position which causes closure of the slave valves whenever the supply valve is operated to allow pressurised gas to be admitted to the central chamber.

One of the slave valves, that communicating with an interconnection between the compressor and dryer, may be arranged to act as a cushion means whereby it is in an actual or potential exhaust condition during initial start-up of the compressor and such that the compressor does not start against a significant pressure differential.

As pressure increases in the main chamber, the exhaust control valve admits pressurised gas to the control side of each slave valve and thus prevents flow to exhaust after an initial cushion period.

One embodiment of the present invention will now be described, by way of example, with reference to the accompanying diagrammatic drawing, in which:

FIG. 1 shows schematically a pneumatic suspension gas supply system for a four-wheel vehicle.

The system comprises a valve manifold unit 20 having a central manifold chamber 21 and four direct-acting electrically operated solenoid valves 11–14 selectively controllable to allow pressurised air to be admitted to a respective air spring 1–4 or exhausted therefrom.

The manifold also incorporates two other electrically operated solenoid valves 15,19. One valve 15 is a supply valve to allow pressurised air to be admitted to the chamber 21 from an external reservoir 17 via a non-return valve 18. Another valve 19 is an exhaust control valve and interconnects with the chamber 21, an external exhaust 22 and the control side 23 of two diaphragm slave valves 24,25.

An externally located compressor 26 connects via passage 27 with an externally mounted regenerative dryer 28. The valve manifold also incorporates an exhaust passage 29 from the slave valve 24.

The exhaust control valve 19 is operable to supply pressurised gas from the chamber 21 to the control sides 24',25' of the valves 24,25 to close those valves. When those valves are closed, valve 24 prevents gas exhausting from line 27 to exhaust passage 29, and valve 25 prevents gas flowing directly between the chamber 21 and a passage 30 that communicates with the dryer. A non-return valve 32 is provided in a passage 33 between the passage 30 and a passage 34 between the reservoir 17 and non-return valve 18 to allow one way flow of gas from the dryer 28 to chamber 21 when valve 25 is closed.

When exhaust control valve 19 is switched to disconnect the control side of valves 24,25 from the chamber 21, the control sides communicate to exhaust 35. Control means is arranged simultaneously to stop operation of the compressor. Gas then flows, regeneratively, through the dryer 28, via valve 25 and passage 30, and exhausts via passage 27, valve 24 and passage 29.

The slave valve 24 may be independently operable actually or potentially to exhaust line 27 during initial start up of the compressor, so that it does not have to start against a significant pressure differential.

In the described system in which a single solenoid valve is used to control two slave valves it is necessary to provide only two instead of three solenoid valves in addition to the solenoid valves which control gas flow to the air springs.

The invention has been described for a four-wheel vehicle in which each wheel has a gas suspension. It may be applied to other suspensions, such as four-wheel vehicles in which only the rear two wheels have a gas suspension.

What is claimed is:

1. A vehicle suspension gas supply system comprising a central chamber to which pressurised gas may be admitted and from which pressurised gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber, a compressor for supply of pressurised gas, a gas dryer interposed between said compressor and central chamber, a remotely operable supply valve operable to allow pressurised gas to be admitted to said central chamber, and a remotely operable exhaust control valve operable simultaneously to control a pair of slave valves, one of said slave valves being operable to allow gas to exhaust from the dryer and the other of said slave valves being operable to allow gas to flow regeneratively through the dryer and to exhaust from that side of the dryer to which pressurized gas is supplied from the compressor.

2. A system according to claim 1, wherein the gas dryer is also interposed between the compressor and a reservoir.

3. A system according to claim 2, wherein the reservoir is in substantially direct communication with the dryer through a one-way valve arranged to allow a flow of gas therethrough only in a direction from the dryer to the reservoir.

4. A system according to claim 1, wherein said remotely operable supply valve is arranged to control flow of gas from a reservoir to the central chamber.

5. A system according to claim 4, wherein a one-way valve is provided in series with the supply valve to allow a flow of gas therethrough only in a direction from the reservoir to the central chamber.

6. A system according to claim 1, wherein the exhaust control valve is operable to direct pressurised gas to the control sides of the slave valves to set those valves to a closed position to prevent flow of pressurised gas to exhaust.

7. A system according to claim 6, wherein control the exhaust control valve causes closure of the slave valves whenever the supply valve is operated to admit pressurised gas to the central chamber.

8. A system according to claim 1, wherein said one slave valve communicates with an interconnection between the compressor and dryer and allows said interconnection to communicate with exhaust during an initial start-up of the compressor.

9. A vehicle comprising a suspension having a gas supply system according to claim 1.

10. A vehicle according to claim 9, wherein said suspension is provided for at least two rear wheels of the vehicle.

* * * * *